(12) United States Patent
Schmitz

(10) Patent No.: US 7,076,363 B1
(45) Date of Patent: Jul. 11, 2006

(54) USING ROUTE NARRATIVE SYMBOLS

(75) Inventor: Michael David Schmitz, Denver, CO (US)

(73) Assignee: America Online, Inc., Dulles, VA (US)

( * ) Notice: Subject to any disclaimer, the term of this patent is extended or adjusted under 35 U.S.C. 154(b) by 88 days.

(21) Appl. No.: 10/620,378

(22) Filed: Jul. 17, 2003

(51) Int. Cl.
G01C 21/26 (2006.01)
G01C 21/36 (2006.01)

(52) U.S. Cl. .................. 701/211; 701/200; 340/990

(58) Field of Classification Search ................ 701/200, 701/202, 209, 211, 208; 340/995.19, 995.24, 340/990, 995.27, 988, 995.1; 73/178 R
See application file for complete search history.

(56) References Cited

U.S. PATENT DOCUMENTS

| | | | |
|---|---|---|---|
| 4,914,605 A * | 4/1990 | Loughmiller et al. ....... | 345/649 |
| 5,465,089 A * | 11/1995 | Nakatani et al. ....... | 340/995.27 |
| 5,504,482 A | 4/1996 | Schreder | |
| 5,648,768 A | 7/1997 | Bouve | |
| 5,752,217 A | 5/1998 | Ishizaki et al. | |
| 6,256,580 B1 | 7/2001 | Meis et al. | |
| 6,282,489 B1 | 8/2001 | Bellesfield et al. | |
| 6,338,021 B1 | 1/2002 | Yagyu et al. | |
| 6,349,261 B1 | 2/2002 | Ohnishi et al. | |
| 6,351,707 B1 | 2/2002 | Ichikawa | |
| 6,356,911 B1 | 3/2002 | Shibuya | |
| 6,434,482 B1 | 8/2002 | Oshida et al. | |
| 6,477,460 B1 * | 11/2002 | Kepler ....................... | 701/209 |
| 6,498,982 B1 | 12/2002 | Bellesfield et al. | |
| 6,826,472 B1 * | 11/2004 | Kamei et al. ................ | 701/202 |
| 6,898,522 B1 * | 5/2005 | Buth et al. .................. | 701/211 |
| 2001/0056325 A1 * | 12/2001 | Pu et al. ..................... | 701/202 |
| 2003/0156049 A1 * | 8/2003 | Behr et al. ............... | 340/995.2 |

FOREIGN PATENT DOCUMENTS

WO WO 00/22593 4/2000

OTHER PUBLICATIONS

"Yahoo! Maps—Directions to LGA, New York, NY," reprinted from http://maps.yahoo.com on Jul. 15, 2003, 3 pages.
"Your Personal Itinerary," reprinted from http://www.freetrip.com on Jul. 15, 2003, 3 pages.

* cited by examiner

Primary Examiner—Dalena Tran
(74) Attorney, Agent, or Firm—Fish & Richardson P.C.

(57) ABSTRACT

Techniques are provided for displaying a route symbol with narrative driving directions. A route symbol for a particular maneuver may be used to represent the road to which the maneuver relates. For example, one type of a route symbol that may be used to represent a road may be an interstate route symbol that has substantially the same appearance (e.g., substantially the same or similar shape, and/or substantially the same coloration) as an interstate route sign used to mark the interstate itself. Another example of a type of a route symbol that represents a road is an highway route symbol that looks substantially the same as a highway route sign used to mark a state highway. A route symbol used for the display of a maneuver also may include route symbols that are related to the type of maneuver, such as the type of a turn, described by the maneuver.

65 Claims, 9 Drawing Sheets

400

DRIVING DIRECTIONS 410a
411a

1. Start out going East on S LUMBER ST towards S HALSTED ST. ← 410

412s — 2. Turn LEFT onto S HALSTED ST. 411b ← 411

413s — 3. Turn RIGHT onto S CANALPORT AVE. 412b ← 412

4. Turn LEFT onto S RUBLE ST. ← 413

414s — 5. Turn SLIGHT LEFT to take the I-90 W/I-94 W ramp towards I-290/ROOSEVELT RD/TAYLOR ST. ← 414

415s — 6. Merge onto DAN RYAN EXWY W. ← 415

416s — 7. Take the I-290 W/EISENHOWER EXPY exit towards WEST SUBURBS/CONGRESS PKWY/CHICAGO LOOP. ← 416

8. Keep LEFT at the fork in the ramp. ← 417

9. Merge onto EISENHOWER EXWY W. ← 418

419s — 10. Take the I-294 S/I-88 W exit- exit number 15A- on the left towards INDIANA/AURORA. ← 419

11. Merge onto E WEST TOLLWAY (Portions toll). ← 420

12. E WEST TOLLWAY becomes I-88 W (Portions toll). ← 421

13. Take the I-80 W exit- exit number 1B- towards DES MOINES. ← 422

14. Keep RIGHT at the fork in the ramp. ← 423

424s — 15. Take the I-235 S exit- exit number 137A- on the left towards DES MOINES. ← 424

16. Merge onto I-235 S. ← 425

427s — 17. I-235 S becomes I-80 W. ← 426

428s — 18. Take the I-76 exit- exit number 102- on the left towards DENVER. ← 427

429s — 19. Merge onto I-25 S. ← 428

20. Take the ZUNI ST exit- exit number 209C- towards W 8TH AVE. ← 429

21. Keep LEFT at the fork in the ramp. ← 430

22. Turn LEFT onto ZUNI ST. ← 431

23. Turn LEFT onto W 8TH AVE. ← 432

434s — 24. W 8TH AVE becomes HAMPTON AVE. ← 434

435s — 25. Turn SLIGHT RIGHT onto W 8TH AVE. ← 435

26. Turn LEFT onto LIPAN ST. ← 436

Total Estimated Time: 16 hours, 56 minutes

Need a hotel, car or flight?
Search Now!

FIG. 4

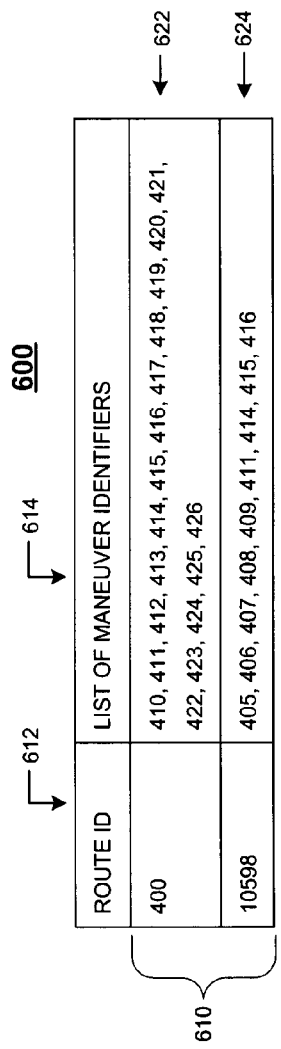
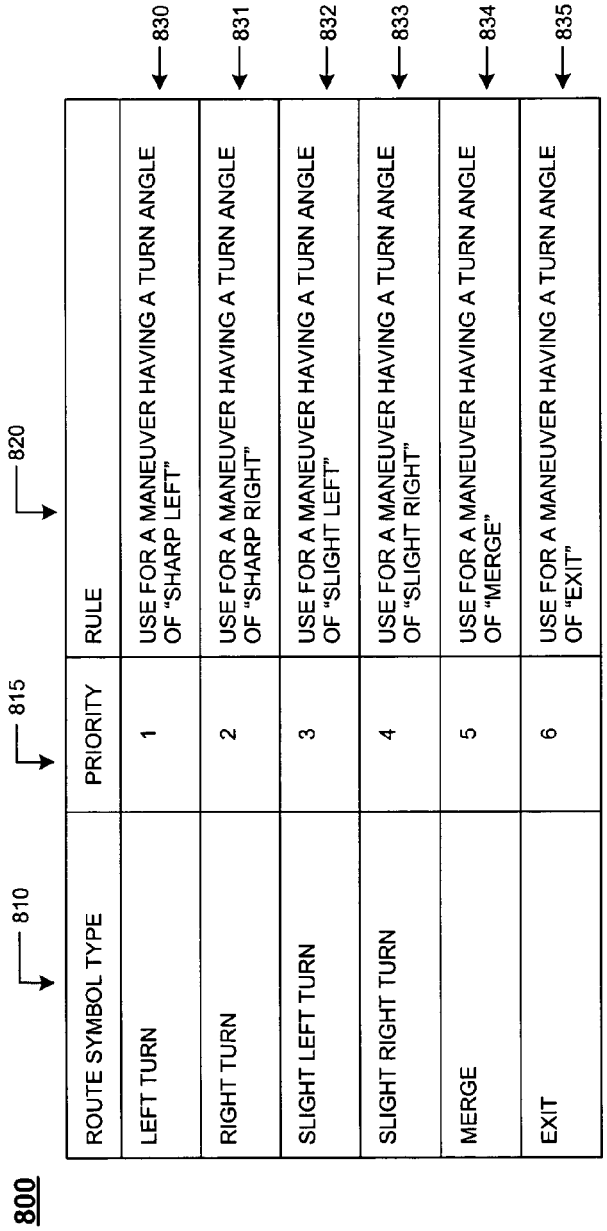
FIG. 6
FIG. 8

| ROUTE ID 912 | MANEUVER ID 914 | ROUTE SYMBOL TYPE 910 | ROAD NUMBER 916 |
|---|---|---|---|
| 400 | 411 | LEFT TURN | |
| 400 | 412 | RIGHT TURN | |
| 400 | 414 | SLIGHT LEFT | |
| 400 | 415 | MERGE | |
| 400 | 419 | INTERSTATE SHIELD WITH NUMBER INDICATOR | 294 |
| 400 | 424 | INTERSTATE SHIELD WITH NUMBER INDICATOR | 235 |
| 400 | 425 | MERGE | |
| 400 | 426 | | |
| 400 | 427 | INTERSTATE SHIELD WITH NUMBER INDICATOR | 76 |
| 400 | 428 | INTERSTATE SHIELD WITH NUMBER INDICATOR | 19 |
| 400 | 429 | EXIT | |
| 400 | 434 | STATE ROAD SHIELD WITH NUMBER INDICATOR | 36 |

← 411
← 412
← 414
← 415
← 419
← 424
← 425
← 426
← 427
← 428
← 431
← 434

1000

| ROUTE SYMBOL TYPE ← 810 | PRIORITY ← 815 | RULE ← 820 |
|---|---|---|
| INTERSTATE | 1 | USE FOR INTERSTATE ROAD ← 1025 |
| HIGHWAY | 2 | USE FOR A HIGHWAY ← 1026 |
| LEFT TURN | 3 | USE FOR A MANEUVER HAVING A TURN ANGLE OF "SHARP LEFT" ← 830 |
| RIGHT TURN | 3 | USE FOR A MANEUVER HAVING A TURN ANGLE OF "SHARP RIGHT" ← 831 |
| SLIGHT LEFT TURN | 3 | USE FOR A MANEUVER HAVING A TURN ANGLE OF "SLIGHT LEFT" ← 832 |
| SLIGHT RIGHT TURN | 3 | USE FOR A MANEUVER HAVING A TURN ANGLE OF "SLIGHT RIGHT" ← 833 |
| MERGE | 3 | USE FOR A MANEUVER HAVING A TURN ANGLE OF "MERGE" ← 834 |
| EXIT | 3 | USE FOR A MANEUVER HAVING A TURN ANGLE OF "EXIT" ← 835 |

FIG. 10

USING ROUTE NARRATIVE SYMBOLS

TECHNICAL FIELD

This description relates to presenting driving directions for a travel route between an origin location and a destination location.

BACKGROUND

A travel route between an origin location and a destination location may be determined by a computer system, which may be referred to as a mapping system. A user of a mapping system may desire to see driving directions, such as a list of maneuvers in the travel route and a narrative description of each maneuver to be made. The driving directions may be difficult to comprehend, particularly while attempting to follow the driving directions and drive a vehicle at the same time. An overview of the driving directions, such as the interstates and highways included in the travel route, also may be difficult to comprehend based on the narrative description of each maneuver when many maneuvers are included in a travel route. This may occur, for example, when a travel route covers many hundreds of miles and involves traveling on many different interstates and highways.

SUMMARY

In one general aspect, driving directions having multiple maneuvers are displayed. Maneuver information for a route from an origin to a destination is accessed. An interstate shield route symbol that has substantially the same appearance as an interstate road sign and includes a road number is associated with a maneuver of the driving directions that represents a first occurrence of a particular interstate having the road number in a list of maneuvers for the route.

Implementations may include one or more of the following features. For example, the association of route symbols with maneuvers may continue until all first occurrences, or all occurrences, of interstates are associated with interstate shield route symbols. The interstate shield route symbol may have substantially the same shape or the same coloration as an interstate road sign. The interstate shield route symbol may be a highway shield route symbol of a country other than the United States.

A highway shield route symbol that has substantially the same appearance as a highway road sign and includes a road number may be associated with a maneuver of the driving directions that represents a first occurrence of a particular highway having the road number in the list of maneuvers for the route. The highway shield route symbol may have substantially the same shape or the same coloration as a highway road sign.

A turn route symbol may be associated with a maneuver based on a turn angle of the maneuver when the maneuver does not represent a first occurrence of a particular interstate having a particular road number in the list of maneuvers for the route and, in some implementations, when the maneuver does not represent a first occurrence of a particular highway having a particular road number in the list of maneuvers. Different kinds of turn route symbols may be associated with a maneuver. For example, a slight left or right turn route symbol may be associated with a maneuver that includes a slight left or right turn. A sharp left or right turn route symbol may be associated with a maneuver that includes a sharp left or right turn.

A merge route symbol may be associated with a maneuver that includes an angle of a merge of two roads. Similarly, an exit route symbol may be associated with a maneuver that includes an exit from a highway or an interstate.

In some implementations, no more than one route symbol may be associated with a particular maneuver. Priority information may be applied to determine a route symbol type of several route symbol types to be associated with a maneuver of the driving directions that does not represent a first occurrence of a particular interstate, and the determined route symbol type may be associated with the maneuver.

The driving directions including the interstate shield route symbol associated with a maneuver may be displayed. The driving directions may be displayed by a system provided through an Internet service provider, a printer associated with a client system, a display device associated with a client system, or a display device associated with a vehicle onboard navigation system.

In another general aspect, driving directions having multiple maneuvers may be displayed by accessing maneuver information for a route from an origin to a destination, applying priority information to determine a route symbol of several route symbol types to be associated with a maneuver of the driving directions, and associating the determined route symbol with the maneuver. An interstate shield route symbol that has substantially the same appearance as an interstate road sign and includes a road number is associated with a maneuver of the driving directions that represents an first occurrence of a particular interstate having the road number in a list of maneuvers for the route. Each maneuver in the list of maneuvers for the route is associated with at most one route symbol.

Implementations may include one or more of the features noted above.

Implementations of any of the techniques described may include a method or process, an apparatus or system, or computer software on a computer-accessible medium. The details of one or more implementations are set forth below. Other features will be apparent from the description and drawings, and from the claims.

DESCRIPTION OF DRAWINGS

FIG. 4 is a diagram depicting driving directions in which route symbols are displayed for narrative driving directions.

FIGS. 6–10 are diagrams depicting example data structures used to display a route symbol for driving directions for a travel route.

DETAILED DESCRIPTION

Figure 1:
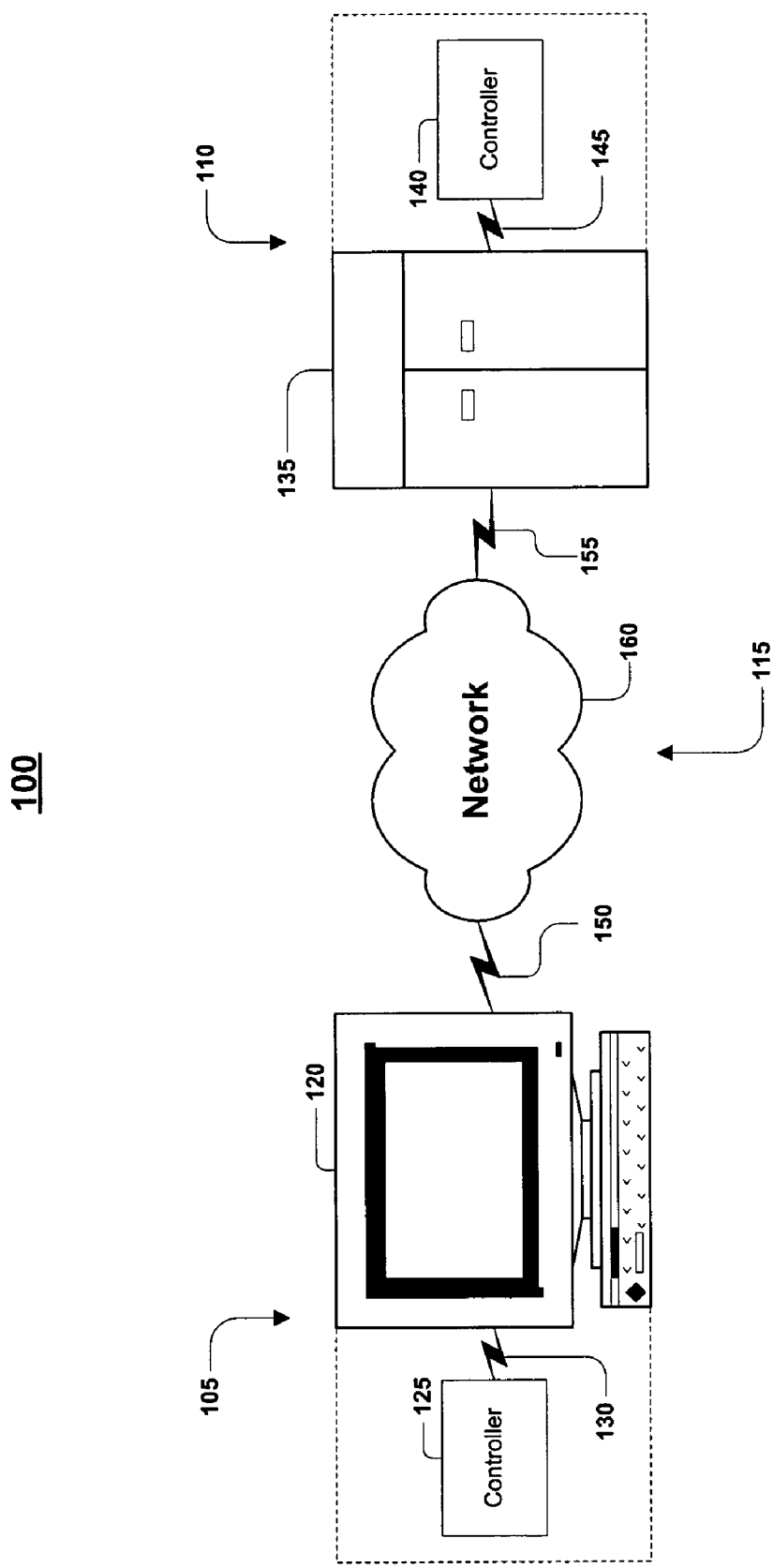
FIG. 1 is a block diagram of a communications system capable of displaying route narrative symbols for driving directions of a travel route.

Techniques are provided for displaying a route symbol with narrative driving directions. A route symbol for a particular driving maneuver may be used to represent the road to which the maneuver relates. For example, one type of a route symbol that may be used to represent a road may be an interstate route symbol that has substantially the same appearance (e.g., substantially the same or similar shape, and/or substantially the same coloration) as an interstate route sign used to mark the interstate itself. Another example of a type of a route symbol that represents a road is a highway route symbol that has substantially the same appearance as a highway route sign used to mark a state highway. Yet another example of a type of a route symbol that represents a road is a state road symbol that looks substantially similar in appearance to a state road sign used to identify a state road. A route symbol used for the display of a maneuver also may include a route symbol that is related to the type of maneuver, such as the type of a turn, described by the maneuver. Examples of a type of a route symbol that represents a type of the turn include a route symbol representing a sharp left turn, a sharp right turn, a slight left turn, a slight right turn, a merge, an entrance to a highway or an interstate, or an exit from a highway or an interstate.

The use of a route symbol for a maneuver may provide a visual reference for a user that helps the user comprehend the driving directions more rapidly than the user could comprehend the narrative presentation of driving directions alone. The ability of a driver to glance at a display of driving directions and quickly comprehend the next maneuver to be made in following the driving directions may be useful. The comprehension of driving directions by a driver may be improved with the display of a route symbol with driving direction narrative text. This may be particularly true when the route symbol is placed before (or prefaces) the driving directions narrative text.

In another context, the display of a route symbol for driving directions also may enable a user to understand the displayed travel route more quickly than when only narrative driving directions are displayed. For example, a user may be able to quickly view fifty route maneuvers and understand the interstates and highways that are included in the travel route, and, in so doing, understand the general travel route to be taken between the origin and destination. The user may be able to more quickly comprehend a travel route when the driving directions include a road route symbol for each interstate or highway to be traveled, as compared to the time required for the user to understand display of the same travel route with only narrative text or narrative text and turn route symbols. Driving directions may include a road route symbol for each interstate or highway to be traveled, for example, by including each unique interstate or highway road change.

More than one route symbol may be applicable for any particular maneuver. For example, both a route symbol relating to the road involved in the maneuver and a route symbol relating to the turn involved in the maneuver may be applicable to a particular maneuver. Using only a single route symbol for a maneuver reduces the number of route symbols displayed in the driving directions. This may be advantageous in reducing the amount of information that a user has to view, read and understand, which, in turn, may enable the user to comprehend a particular maneuver or multiple maneuvers more quickly.

The use of a route symbol that represents a road may be advantageous as compared with the use of a route symbol that represents the type of turn. This may be particularly true when a route symbol that represents a road is used on the first occurrence of the road in the driving directions. The presentation of a route symbol that represents the first occurrence of an interstate or a highway road change may be particularly advantageous, as described above.

Figure 2:
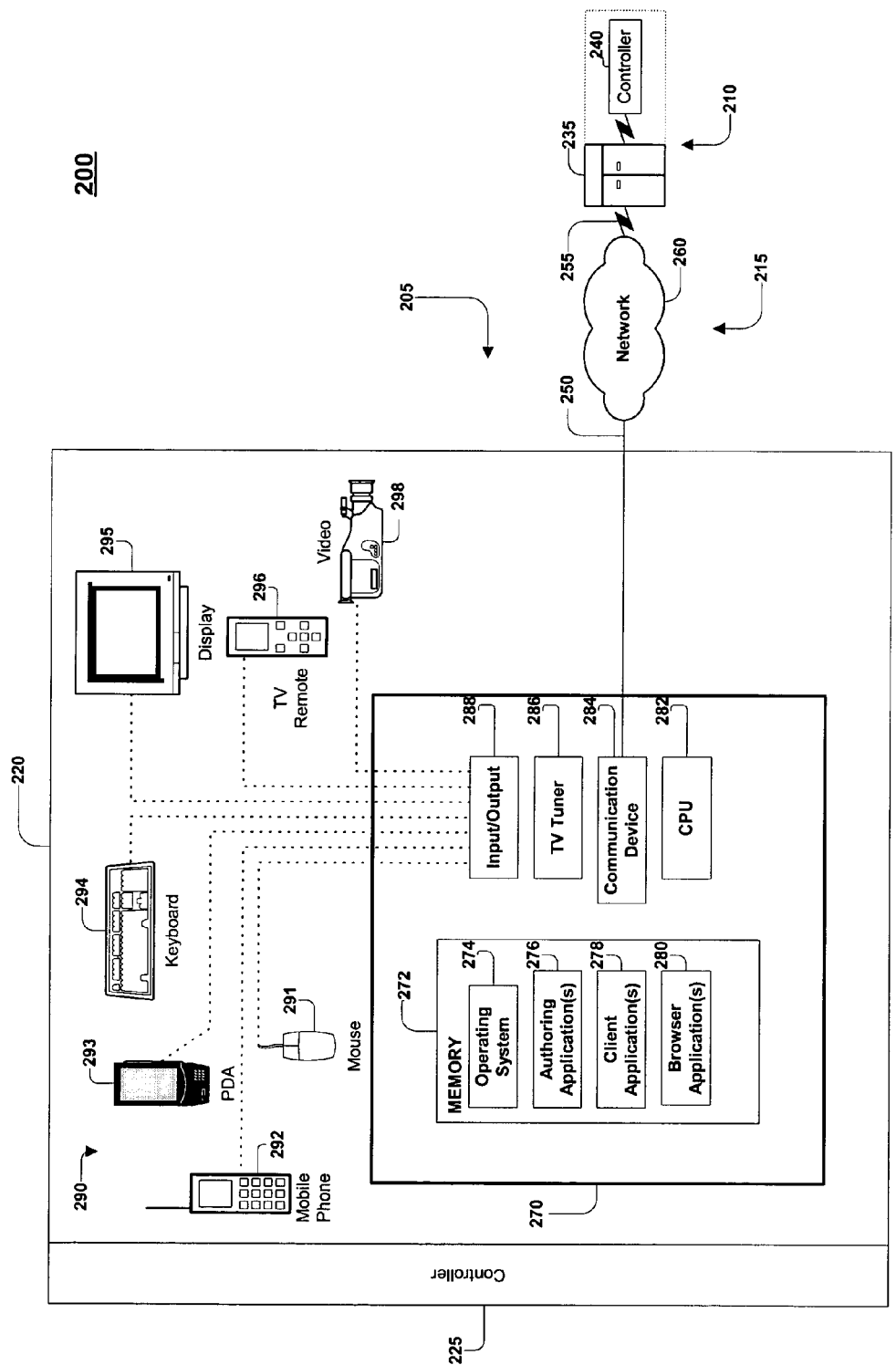
FIG. 2 is an expansion of the block diagram of FIG. 1.

For illustrative purposes, FIGS. 1 and 2 describe a communications system that may be used to request and provide routes, including driving directions, between origin and destination locations. For brevity, several elements in the figures described below are represented as monolithic entities. However, as would be understood by one skilled in the art, these elements each may include numerous interconnected computers and components designed to perform a set of specified operations and/or dedicated to a particular geographic region.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired pathway 150 or 155, a wireless data pathway 150 or 155 capable of delivering data, or, when the client controller 125 (or host controller 140) is a software application loaded on the client device 120 (or the host controller 140), a virtual pathway.

Each of the client device 120, the client controller 125, the host device 135, and the host controller 140 typically includes one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of the client controller 125 or the host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 that provides a direct or indirect communication link between the client system 105 and the host system 110, irrespective of physical separation. Examples of a delivery network 160 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, wired, wireless, virtual, cable or satellite communications pathway.

FIG. 2 illustrates a communication system 200 including a client system 205 communicating with a host system 210 through a communications link 215. The client system 205 typically includes one or more client devices 220 and one or more client controllers 225 for controlling the client devices 220. The host system 210 typically includes one or more host devices 235 and one or more host controllers 240 for controlling the host devices 235. The communications link 215 may include communications pathways 250 and 255 that enable communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to, and may illustrate one possible implementation of, the client system 105 of FIG. 1.

The client device 220 typically includes a general purpose computer 270 having an internal or external storage 272 for storing data and programs such as an operating system 274 (e.g., DOS, Windows®, Windows® 95, Windows® 98, Windows® 2000, Windows® NT, Windows® Millennium Edition, Windows® XP, OS/2, or Linux) and one or more application programs. Examples of application programs include authoring applications 276 (e.g., word processing programs, database programs, spreadsheet programs, presentation programs, and graphics programs) capable of generating documents or other electronic content; client applications 278 (e.g., AOL ("America Online") client, CompuServe client, AIM ("America Online Instant Messenger") client, AOL TV ("America Online Television") client, and an ISP ("Internet Service Provider") client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer 270 typically includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by the communications device 284 and television programming content received by the TV tuner 286.

The general-purpose computer 270 typically includes an input/output interface 288 to enable a wired or wireless connection to various peripheral devices 290. Examples of peripheral devices 290 include, but are not limited to, a mouse 291, a mobile phone 292, a personal digital assistant (PDA) 293, a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some, all, or none of the components and devices described above.

Figure 3A:
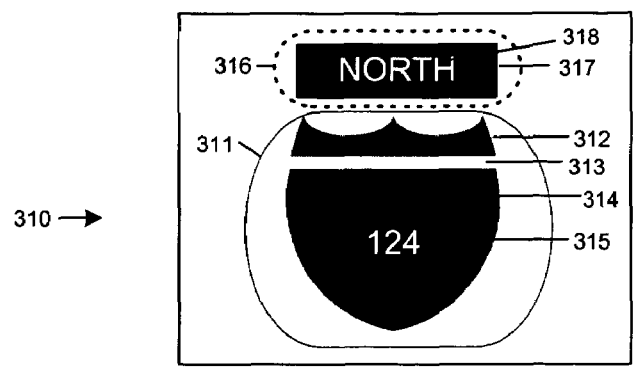
FIGS. 3A, 3B and 3C are diagrams illustrating route symbols that are displayed for driving directions for a travel route.
Figure 3B:
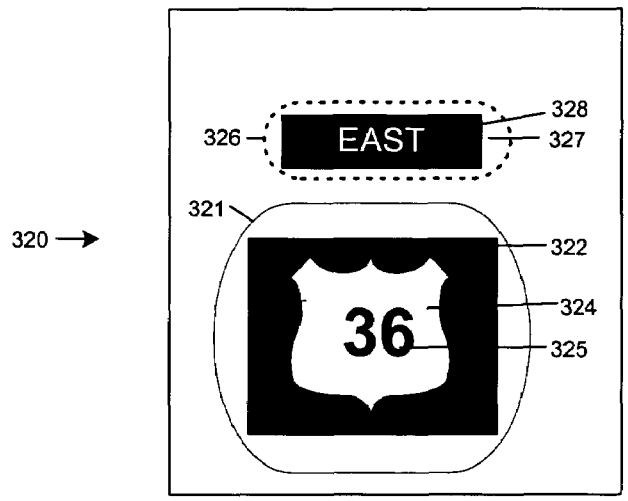
Figure 3C:
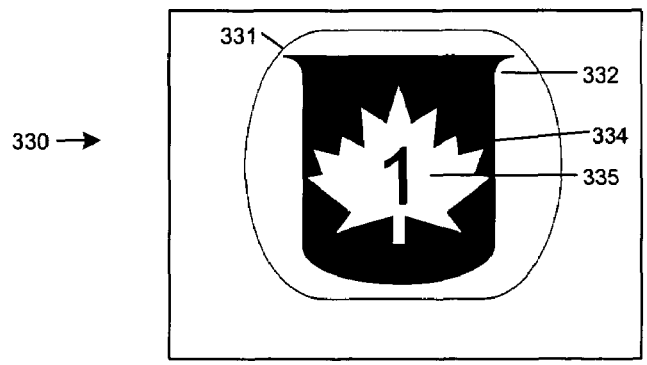

FIGS. 3A, 3B and 3C show examples of route symbols that may be used to identify a particular road referenced in a driving directions display. Referring to FIG. 3A, the route symbol 310 is an interstate shield route symbol 310, which includes an interstate shield 311 and, optionally, a direction indicator 316. The interstate shield 311 is substantially the same in shape and coloration as the well-known road sign used to identify an interstate. The interstate shield 311 has a red crown 312, a white strip 313, and a blue pointed semi-circle 314. The blue pointed semi-circle 314 includes an interstate number indicator 315. The interstate number indicator 315 is used to identify the number of the interstate referred to in the maneuver to which the route symbol 310 applies.

The optional direction indicator 316 includes a blue rectangle 317 and white-lettered text direction 318 that indicates the direction of travel for the interstate. Here, the interstate number indicator 315 is "124," and the optional direction indicator 316 has a text direction 318 of "NORTH." The interstate shield route symbol 310 represents Interstate 124 North.

The interstate shield route symbol 310 may be used to identify the first occurrence of a particular interstate in a driving directions display. The use of the interstate shield route symbol 310 to identify the first occurrence of a particular interstate in a driving directions display may enable a driver, or another type of user of the driving directions display, to more quickly understand that the travel route includes the particular interstate (here, Interstate 124 North).

Referring to FIG. 3B, the route symbol 320 is a highway shield route symbol 320, which includes a highway symbol 321 and, optionally, a direction indicator 326. The highway symbol 321 includes a black rectangle 322, a highway shield 324, and a highway number indicator 325. The highway symbol 321 is substantially the same in shape and coloration as the well-known sign used to identify the highway referred to in the maneuver to which the route symbol 320 applies. The optional highway direction indicator 326 includes a black rectangle 327 and white-lettered text 328 identifying the travel direction. The highway shield route symbol 320 may be used to identify the first occurrence of a particular state highway in a driving directions display.

Referring to FIG. 3C, in some implementations, driving directions may be displayed for roads outside of the United States, as illustrated by the route symbol 330. The route symbol 330 is a Canadian highway route symbol 330 that includes a Canadian highway shield 331 that is substantially the same in shape and coloration as the well-known road signs used to identify the Canadian highway. The Canadian highway shield 331 includes a black symbol 332 having a white maple leaf 334 on which a Canadian highway number indicator 335 appears. The Canadian highway shield route symbol 330 may be used to identify the first occurrence of a particular Canadian highway in a driving directions display.

In some implementations, a pure black-and-white representation, a grayscale representation, or another type of non-color representation of a route symbol may be used in lieu of, or in addition to, the color representation of the route symbol.

FIG. 4 illustrates an example of driving directions 400 in which each maneuver is prefaced with up to one route symbol. The driving directions 400 include maneuvers 410–436. Each maneuver includes a sequence indicator that indicates the order in which each maneuver is to be executed relative to the other maneuvers. For example, maneuver 410 includes a sequence indicator 410a of "1" and maneuver 411 includes a sequence indicator 411a of "2." The sequence indicators indicate that the maneuver 410 is executed first and the maneuver 411 is executed second.

Each of maneuvers 410–436 includes a narrative text that describes the maneuver. For example, maneuver 411 includes the narrative text 411b of "Turn LEFT onto S HALSTED ST." The maneuver 412 includes the narrative text 412b of "Turn RIGHT onto S CANALPORT AVE."

Many of the maneuvers 410–436 include a route symbol that represents the first occurrence of an interstate or highway in the travel route. Examples include route symbols 416s, 419s, 424s, 427s and 428s, all of which are interstate shield route symbols and each of which represents a maneuver that involves an interstate. Another example of a route symbol that represents the first occurrence of an interstate or highway in the travel route is route symbol 434s, which is a highway shield route symbol that represents a maneuver that involves a state highway that is identified as state highway 36.

Many of the maneuvers 410–436 also include a route symbol that represents the action required to execute the maneuver. In some cases, a route symbol that represents the type of turn is used for a maneuver. Examples include route symbol 412s for a sharp right turn, route symbol 413s for a sharp left turn, route symbol 414s for a slight left turn, route symbol 415s for a merge, route symbol 429s for an exit from an interstate or a highway, and route symbol 435s for a slight right turn.

The displayed driving directions 400 may provide a user an overview of the planned travel route. For example, by scanning the interstate shield route symbols 416s, 419s, 424s, 427s and 428s in the driving directions 400, a person may gain an understanding that the travel route includes Interstate 290, Interstate 294, Interstate 235, Interstate 76 and Interstate 25, each of which are identified by the corresponding route symbol. This may provide the user an overview of the planned travel route more quickly than if the user had to read and understand the narrative text for each of the maneuvers 410–436.

Additionally or alternatively, the displayed driving directions 400 also may enable a driver to understand an upcoming maneuver more easily than if the driving directions had only included the narrative text for each of the maneuvers 410–436. For example, the driver is able to discern information about the type and/or direction of a turn in a maneuver from the turn route symbols (such as 412s, 413s, 414s, 415s, 429s and 435s). A driver may be able to understand the angle of the turn involved in each of the maneuvers 411–414 (that is, that the maneuvers 411–414 involve a sharp left turn, a sharp right turn, a sharp left turn, and a slight left turn) and the turns involved in the maneuvers 411–414 occur in that order. A driver then may be able to more easily prepare for a maneuver than if the driver were using driving directions that only included narrative text to describe a maneuver. For example, a driver may change lanes to prepare for a particular turn.

Figure 5:
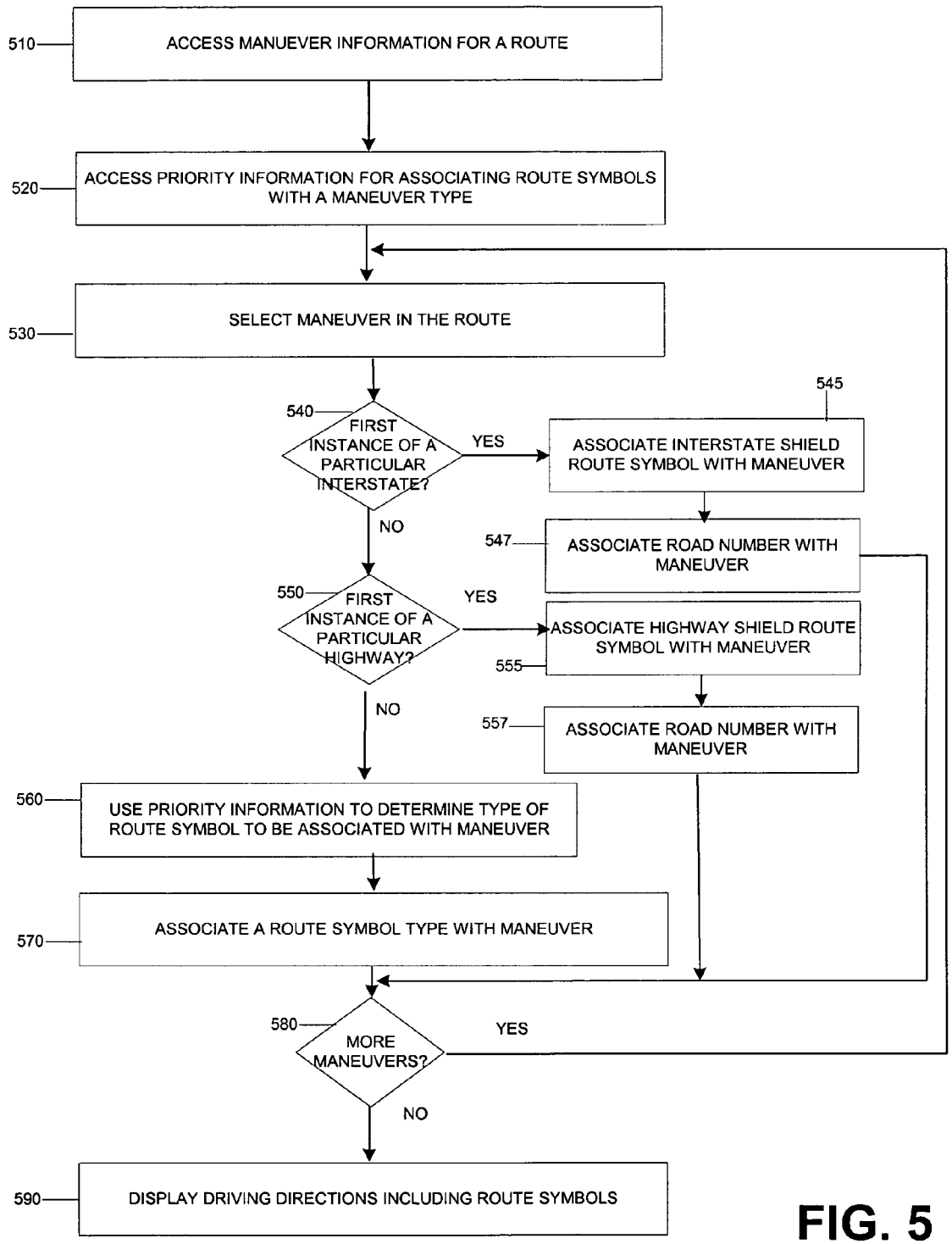
FIG. 5 is a flow chart illustrating a process for displaying driving directions in which a route symbol is displayed for a driving maneuver.

FIG. 5 shows a process 500 for displaying driving directions in which a route symbol is displayed with a driving maneuver. The process 500 may be performed by a host system, such as described previously. FIGS. 6–9 illustrate example data structures and data values that may be used with process 500 to display driving directions in which a maneuver is displayed with a route symbol.

The process begins when the host system accesses maneuver information for a route (step 510). The maneuver information may include a list of maneuvers associated with a particular travel route. The maneuver information also may include a road type, a turn angle, and a narrative text for each maneuver associated with the particular travel route.

Figure 7:
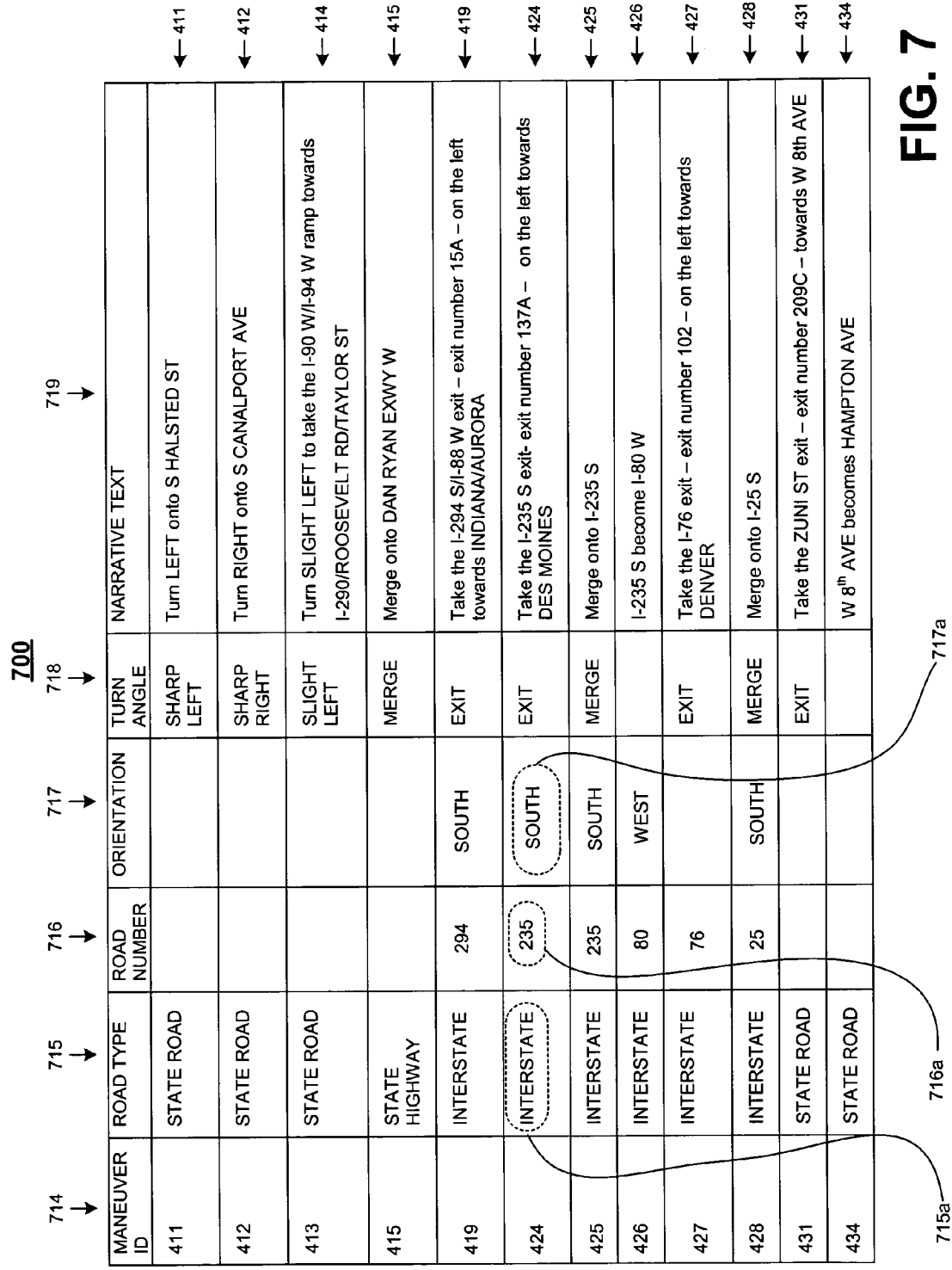

Referring to FIGS. 6 and 7, in general, the host system may access a table, a list or another type of data structure that associates a list of maneuvers with a route identifier that identifies the particular travel route for which the driving directions are displayed. Each maneuver in the list of maneuvers is represented by a maneuver identifier, and the travel route is represented by a route identifier ("ID"). Maneuver information for each maneuver in the list of maneuvers is identifiable by a maneuver identifier. Maneuver information is associated with a particular route through the list of maneuvers for the particular route.

More specifically, FIG. 6 shows one example of a data structure 600 that may be used to identify the maneuvers in a route. The route information 600 may be stored in a relational database system that logically organizes data into a database table. The database table arranges data associated with an entity (here, a travel route) in a series of columns 612 and 614 and rows 622 and 624. Each column 612 or 614 describes an attribute of the travel route for which data is being stored. Each row 622 or 624 represents a collection of attribute values for a particular travel route. The attribute 612 represents a routing ID for the travel route represented by the row 622 or 624. The attribute 614 is a list of maneuver identifiers for maneuver information for a maneuver included in the route.

FIG. 7 shows one example of maneuver information 700 for a maneuver in a travel route. The maneuver information 700 may be stored in a relational database system that logically organizes data into a database table. The database table arranges data associated with a maneuver in a series of columns 714–719 and rows 411–434. Each column 714–719 represents an attribute of a maneuver, and each row 411–434 represents a collection of attribute values for a particular maneuver. The attributes are used to display driving directions, such as the maneuvers 411–434 of the displayed driving directions 400 of FIG. 4.

The attribute 714 includes a maneuver ID to uniquely identify a maneuver in the attribute 714 of the maneuver information 700. The maneuver ID corresponds to a maneuver ID in the list of maneuver identifiers in attribute 614 for a particular route identified by the route ID 612 in the route information 610.

The maneuver information in data structure 700 also includes road type 715, road number 716, orientation 717, turn angle 718, and narrative text 719. The road type 715 includes an indication of the type of road involved in the maneuver, which often is the road to which a maneuver is made. Examples of indicators of the type of road include whether the road is a state road, a state highway, or an interstate. The road number 716 indicates the particular road number of the road involved in the maneuver. Together, the road type and road number identify a particular road involved in the maneuver. For example, the particular road I-235 is identified using a road type 715*a* of "INTERSTATE" and a road number 716*a* of "235." The orientation 717 identifies the orientation, such as a travel direction (e.g., North, West, South, and East), involved in the maneuver. A particular orientation 717*a* for a maneuver used with the road type and road number of the maneuver indicates the travel direction of the road (e.g., I-235 SOUTH). The road type 715, the road number 716 and, optionally, the orientation 717 may be used by the host system to generate a road route symbol for the maneuver in driving directions for a travel route that includes the maneuver.

The turn angle 718 includes an indication of the degree of angle involved in a turn of the maneuver. The turn angle 718, for example, may be one of a sharp left, a sharp right, a slight left, a slight right, a merge, or an exit. The turn angle 718 may be used by the host system to generate a turn route symbol for the maneuver in driving directions for a travel route that includes the maneuver.

The narrative text 719 includes the textual description for the maneuver that may be displayed in the driving directions for a travel route that includes the maneuver. Some maneuvers in the maneuver information 700 include only narrative text and not values for each of the road type 715, the road number 716, the orientation 717 and the turn angle 718. This is shown by maneuver 415.

Referring again to FIG. 5, the host system then accesses priority information for associating route symbols with a maneuver type (step 520). For example, the host system may access priority information stored in a table, a list, or another type of data structure, as illustrated in FIG. 8.

FIG. 8 shows one example of priority information 800 for route symbols. The priority information 800 may be stored in a relational database system that logically organizes data into a database table. The database table arranges the priority information in a series of columns 810, 815 or 820 and rows 830–835. Each column 810, 815 or 820 describes an attribute related to priority information for a route symbol. Each row of rows 830–835 represents a collection of attribute values for a particular route symbol.

The priority information 800 includes a route symbol type 810, a priority 815, and a rule 820 for determining the order in which the particular route symbol types are displayed for maneuvers in driving directions for a travel route. The route symbol 810 indicates the type of route symbol to which the priority 815 applies. The priority 815 indicates a priority of a route symbol as compared with other route symbols. Here, the priority 815 indicates a sequence number that indicates the relative preference for each particular route symbol type for which priority information 800 applies.

In this implementation, neither the interstate shield route symbol nor the highway shield route symbol is included in the route symbol types for which priority information 800 applies. Priority information 800 about an interstate shield route symbol and a highway shield route symbol are not necessary because of the particular process 500 to which priority information 800 relates. Other implementations may include an interstate shield route symbol and/or a highway shield route symbol in priority information.

Referring again to FIG. 5, the host system then selects a maneuver in the travel route (step 530). For example, the host system may access the first maneuver in the list of maneuvers previously accessed.

The host system determines whether the maneuver includes the first instance of a particular interstate in the driving directions for the route (step 540). To do so, the host system, for example, may use maneuver information 700 to determine whether the maneuver is of a road type of "INTERSTATE" (by accessing road type 715 of maneuver information 700 of FIG. 7) and, if so, determine the road number (by accessing road number 716 of maneuver information 700 of FIG. 7). When the maneuver relates to an interstate, the host system then may access, in a similar manner, maneuver information 700 for each maneuver in the travel route to determine whether the interstate is a first instance of the particular interstate in the driving directions for the travel route.

Alternatively, the host system may dynamically develop, as the host system determines a route symbol, a list of interstate numbers that are referenced in the driving directions for the travel route. Then the host system may access the list of interstates to determine whether the interstate referenced in the current maneuver is listed. When the interstate is not listed on the list of interstates, the host system determines that the maneuver includes a first instance of the particular interstate.

When the host system determines that the interstate is a first instance of a particular interstate in the driving directions for the travel route (step 540), the host system associates the interstate shield route symbol with the maneuver (step 545). This may be accomplished, for example, by using the data structure 900 of FIG. 9 to associate the maneuver of a travel route with a route symbol type.

FIG. 9 shows one example of routing symbols 900 displayed for the travel route having driving directions 400 of FIG. 4. The routing symbols 900 for a travel route may be determined through the process 500 of FIG. 5 and may be stored in a relational database system that logically organizes data into a database table. The database table arranges the routing symbols associated with a travel route in a series of columns 910, 912, 914 and 916 and rows 411–434. Each column 910, 912, 914 and 916 describes an attribute of the maneuver in the travel route for which data is being stored. Each of rows 411–434 represents a collection of attribute values for a particular maneuver identified by the maneuver ID 914 that is included in the travel route identified by the route ID 912. Each of rows 411–434 corresponds to a maneuver displayed in the driving directions 400 of FIG. 4. The route-symbol-type attribute 910 identifies the type of route symbol to be displayed for the maneuver identified by the maneuver ID 914 that is included in the travel route identified by the route ID 912. The road number 916 describes the road number to be used for a road route symbol, such as an interstate shield with a number indicator (as in rows 419, 424, 427 or 428) or a state road shield with a number indicator (as in row 434).

Referring to FIG. 5, the host system also associates the particular road number with the maneuver in the driving directions (step 547). To do so, the host system adds or updates the road number 916 of FIG. 9 with the road number 716 accessed from maneuver information 700 of FIG. 7.

Referring to FIG. 5, the host system then determines whether there are more maneuvers in the travel route for which a route symbol is to be associated (step 580), and, if so, the host system proceeds by selecting another maneuver (step 530).

When the host system determines that the maneuver is not a first instance of a particular interstate in the driving directions for the travel route (step 540), the host system determines whether the maneuver is a first instance of a particular highway in the driving directions for the travel route (step 550). To do so, the host system determines, based on the accessed maneuver information, whether the maneuver is for a "STATE HIGHWAY" and, if so, determines the road number for the maneuver. The host system then determines whether a highway route symbol with the road number has been previously associated with the driving directions for the route (such as being associated with a different maneuver for the travel route). This may be accomplished, for example, by the host system scanning or otherwise accessing the list of route symbols 900 that have been associated with maneuvers for the travel route, as described previously with respect to FIG. 9.

When the host system determines that the current maneuver is a first instance of a particular highway in the driving directions for the travel route (step 550), the host system associates the highway shield route symbol with the driving directions for the maneuver of the travel route (step 555) and associates the road number with the driving directions for the maneuver of the travel route (step 557). To do so, the host system may add or update maneuver information for the particular maneuver to include the highway shield route symbol as route symbol type 910 and the road number 916, both of which have been described previously with respect to FIG. 9.

The host system then determines whether there are more maneuvers with which route symbol needs to be associated (step 580), and, if so, the host system proceeds by selecting another maneuver (step 530).

When the host system determines that the current maneuver is not a first instance of a particular highway in the driving directions for the travel route (step 550), the host system then uses priority information to determine the type of route symbol to be associated with the current maneuver (step 560). To do so, for example, the host system may use priority information 800 of FIG. 8. The host system, beginning with the highest priority route symbol (as may be indicated by the priority 815 of priority information 800 of FIG. 8), determines whether the priority rule 820 for the highest priority route symbol is met by the turn angle or road type of the maneuver information for the current maneuver selected in step 530.

When the priority rule is met, the route symbol type 810 is associated with the maneuver, for example, by updating the route symbol type 910 for the maneuver with the route symbol type 810 of priority information 800 of FIG. 8. When the priority rule is not met by the current maneuver, the host system determines whether the priority rule of the route symbol type 810 with the next highest priority value of priority 815 is met by the current maneuver, and, if so, updates the route symbol type 910. When the priority rule is not met by the current maneuver, the host system continues checking each rule 820 in the priority information 800 of FIG. 8 until all priority rules have been checked or a route symbol type has been associated with the current maneuver.

When the host system determines the route symbol type to be associated with the current maneuver, the host system associates the route symbol type with the current maneuver (step 570). This may be accomplished, for example, by associating the route symbol type 810 of the priority information 800 in FIG. 8 with the route symbol type 910 of the corresponding maneuver for the driving directions 900 of FIG. 9.

The host system determines whether there are more maneuvers with which route symbols need to be associated (step 580), and, if so, the host system proceeds by selecting another maneuver (step 530).

When the host system has completed associating route symbols with the maneuvers for the driving directions for the travel route (step 580), the host system displays the driving directions including the associated route symbols (step 590). An example of the displayed driving directions has been described previously with respect to FIG. 4. A particular route symbol may be displayed from an association of a graphic file or graphic image including the route symbol and the route symbol type associated with the maneuver, such as the route symbol type 910 in routing symbols 900 for a travel route, as previously described with respect to FIG. 9.

The driving directions may be displayed on a client system display, such as the display 295 of FIG. 2. The driving directions also may be printed on a printer associated with a client system, such as the client system 105 of FIG. 1 or the client system 205 of FIG. 2, or may be displayed on a display associated with an on-board vehicle navigation system.

Some implementations may use other techniques to display driving directions in which a maneuver is displayed with a route symbol that indicates each unique occurrence of a particular interstate or a particular highway. For example, priority information may include priority information for an interstate shield route symbol and the priority information may be used to control the association of a interstate shield route symbol with a maneuver (in contrast to process 500 described previously with respect to FIG. 5). Additionally or alternatively, a route symbol may be categorized as to whether the route symbol is for a road or for a turn angle. The process to display driving directions may use any route symbol that is in the category of road route symbols before using a route symbol that is in the category of turn-angle route symbols.

Referring to FIG. 10, priority information 1000 for the display of route symbols includes priority information for an interstate and for a highway. The priority information 1000 includes a route symbol type 810, a priority 815, and a rule 820 for determining the order in which the particular route symbol types are displayed for maneuvers in driving directions for a travel route. In this example, the interstate route symbol type of row 1025 has the highest priority 815 (here, "1"), the highway route symbol type of row 1026 has the second highest priority 815 (here, "2"), and all of the route symbols that relate to a turn angle (here, rows 830–835) have the third highest priority (here, "3"). In this implementation, the route symbols that relate to a turn angle can have the same priority because a maneuver is only capable of being one of multiple types of turn angles. The process to display driving directions determines a route symbol for a maneuver by displaying an interstate route symbol first, and, if the interstate route symbol is not appropriate for the maneuver, a highway route symbol is then displayed. If a highway route symbol is not appropriate for the maneuver, one of the turn angle route symbols is displayed.

Although FIGS. 1–10 illustrate systems and methods for displaying driving directions in which the first occurrence of a particular interstate (or highway) is associated with a route symbol that has substantially the same appearance as the interstate (or highway) road sign, some implementations may apply the techniques for displaying driving directions in which all occurrences of a particular interstate (or highway) are associated with a route symbol that has substantially the same appearance as the interstate (or highway) road sign.

The techniques also may be applicable to highways outside of the United States, that do not necessarily refer to a particular type of highway as an interstate. For example, in Canada, there may be multiple types of highways, none of which are referred to as interstates. In another example, the Autobahn in Germany is not referred to as an interstate, and each road of the Autobahn is identified by a particular road number, such as A5. Nevertheless, the technique of associating a route symbol that has substantially the same appearance as a highway road sign and includes a road number with a maneuver of the driving directions that represents an occurrence of the road may be applicable.

The techniques may be applicable, for example, to one or more computing devices for displaying driving directions that communicate in a client system and host system (e.g., an Internet access provider or an Internet service provider) relationship, a single computing device (e.g., with or without networking capabilities), or an embedded system (e.g., a navigation routing system in an automobile or other vehicle).

Implementations may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

Other implementations are within the following claims.

What is claimed is:

1. A method for displaying driving directions having multiple maneuvers, the method comprising:
   accessing maneuver information for a route from an origin to a destination, wherein the maneuver information comprises text information;
   presenting, as a constituent part of the driving directions, a first maneuver along the route involving a particular interstate;
   presenting, as another constituent part of the driving directions, a second maneuver along the route involving the particular interstate, such that the first and second maneuvers are presented consecutively among the driving directions; and
   associating an interstate shield route symbol that has substantially the same appearance as an interstate road sign with less than all presented maneuvers being presented along the route and involving the particular interstate.

2. The method of claim 1 further comprising associating a highway shield route symbol that has substantially the same appearance as a highway road sign and includes a road number with a maneuver of driving directions maneuver that represents only a first occurrence of a particular highway having the road number in the list of maneuvers for the route.

3. The method of claim 2 wherein associating a highway shield route symbol comprises associating a highway shield route symbol that has substantially the same shape as a highway road sign.

4. The method of claim 2 wherein associating a highway shield route symbol comprises associating a highway shield route symbol that has substantially the same coloration as a highway road sign.

5. The method of claim 1 further comprising associating a turn route symbol with a maneuver based on a turn angle of the maneuver when the maneuver does not represent a first occurrence of a particular interstate having a particular road number in the list of maneuvers for the route and the maneuver does not represent a first occurrence of a particular highway having a particular road number in the list of maneuvers.

6. The method of claim 5 wherein associating the turn route symbol comprises associating a slight left turn route symbol with a maneuver that includes a turn angle of a slight left turn.

7. The method of claim 5 wherein associating the turn route symbol comprises associating a slight right turn route symbol with a maneuver that includes a turn angle of a slight right turn.

8. The method of claim 5 wherein associating the turn route symbol comprises associating a sharp left turn route symbol with a maneuver that includes a turn angle of a sharp left turn.

9. The method of claim 5 wherein associating the turn route symbol comprises associating a sharp right turn route symbol with a maneuver that includes a turn angle of a sharp right turn.

10. The method of claim 5 wherein associating the turn route symbol comprises associating a merge route symbol with a maneuver that includes an angle of a merge of two roads.

11. The method of claim 5 wherein associating the turn route symbol comprises associating an exit route symbol with a maneuver that includes a turn angle of an exit from a highway or an interstate.

12. The method of claim 5 wherein at most one route symbol is associated with a particular maneuver.

13. The method of claim 1 further comprising:
    applying priority information to determine a route symbol type of several route symbol types to be associated with a maneuver of the driving directions that does not represent a first occurrence of a particular interstate; and
    associating the route symbol type with the maneuver.

14. The method of claim 1 further comprising displaying driving directions including the interstate shield route symbol associated with a maneuver.

15. The method of claim 14 wherein the driving directions are displayed by a system provided through an Internet service provider.

16. The method of claim 14 wherein the driving directions are displayed by a printer associated with a client system.

17. The method of claim 14 wherein the driving directions are displayed by a display device associated with a client system.

18. The method of claim 14 wherein the driving directions are displayed by a display device associated with a vehicle on-board navigation system.

19. The method of claim 1 wherein:
the interstate shield route symbol is associated with the maneuver that represents only the first occurrence of the particular interstate among multiple consecutive driving directions involving the particular interstate, and
the method further comprising presenting the route symbol with a later maneuver that appears in the driving directions and that involves the particular interstate if the later maneuver is separated by at least one intermediary maneuver from the multiple consecutive driving directions involving the interstate.

20. The method of claim 1 wherein the road comprises an interstate and the graphical road-identifying symbol comprises an interstate shield route symbol.

21. The method of claim 1 further comprising associating a turn route symbol with a maneuver based on a turn angle of the maneuver when the maneuver does not represent a first occurrence of a particular road having a particular road number in the list of maneuvers for the route and the maneuver does not represent a first occurrence of a particular road having a particular road number in the list of maneuvers.

22. The method of claim 21 wherein associating the turn route symbol comprises associating a slight left turn route symbol with a maneuver that includes a turn angle of a slight left turn.

23. The method of claim 21 wherein associating the turn route symbol comprises associating a slight right turn route symbol with a maneuver that includes a turn angle of a slight right turn.

24. The method of claim 21 wherein associating the turn route symbol comprises associating a sharp left turn route symbol with a maneuver that includes a turn angle of a sharp left turn.

25. The method of claim 21 wherein associating the turn route symbol comprises associating a sharp right turn route symbol with a maneuver that includes a turn angle of a sharp right turn.

26. The method of claim 21 wherein associating the turn route symbol comprises associating a merge route symbol with a maneuver that includes an angle of a merge of two roads.

27. The method of claim 21 wherein associating the turn route symbol comprises associating an exit route symbol with a maneuver that includes a turn angle of an exit.

28. The method of claim 21 wherein at most one route symbol is associated with a particular maneuver.

29. A method for displaying driving directions having multiple maneuvers, the method comprising:
accessing maneuver information for a route from an origin to a destination;
associating an interstate shield route symbol that has substantially the same appearance as an interstate road sign and includes a road number with a maneuver of the driving directions that represents a first occurrence of a particular interstate having the road number in a list of maneuvers for the route; and
repeating the associating until all first occurrences of particular interstates are associated with corresponding interstate shield route symbols.

30. The method of claim 29 further comprising repeating the associating until all occurrences of particular interstates are associated with corresponding interstate shield route symbols.

31. The method of claim 29 wherein the road comprises an interstate and the graphical road-identifying symbol comprises an interstate shield route symbol.

32. A method for displaying driving directions having multiple maneuvers, the method comprising:
accessing maneuver information for a route from an origin to a destination; and
associating an interstate shield route symbol that has substantially the same shape as an interstate road sign and includes a road number with a maneuver of the driving directions that represents a first occurrence of a particular interstate having the road number in a list of maneuvers for the route.

33. The method of claim 32 wherein the road comprises an interstate and the graphical road-identifying symbol comprises an interstate shield route symbol.

34. A method for displaying driving directions having multiple maneuvers, the method comprising:
accessing maneuver information for a route from an origin to a destination; and
associating an interstate shield symbol that has substantially the same coloration as an interstate road sign and includes a road number with a maneuver of the driving directions that represents a first occurrence of a particular interstate having the road number in a list of maneuvers for the route.

35. The method of claim 34 wherein the road comprises an interstate and the graphical road-identifying symbol comprises an interstate shield route symbol.

36. A method for displaying driving directions having multiple maneuvers, the method comprising:
accessing maneuver information representing driving directions for a route from an origin to a destination, wherein the maneuver information comprises textual information;
accessing priority information that includes, for each of several route symbol types, a priority and a condition;
determining a route symbol of the several route symbol types to be associated with a maneuver of the driving directions based on a priority associated with the route symbol and the maneuver fulfilling a condition associated with the route symbol; and
associating the route symbol with the maneuver,
wherein:
each maneuver in the list of maneuvers for the route is associated with at most one route symbol.

37. The method of claim 36 further comprising associating a highway shield route symbol that has substantially the same appearance as a highway road sign and includes a road number with a second maneuver of driving directions that represents an occurrence of a particular highway having the road number in the list of maneuvers for the route.

38. The method of claim 36 wherein the priority associated with and used as a basis for determining the route symbol is a priority associated with a route symbol type corresponding to the route symbol.

39. A method for displaying driving directions having multiple maneuvers, the method comprising:
accessing maneuver information for a route from an origin to a destination;
associating an interstate shield route symbol that has substantially the same appearance as an interstate road sign and includes a road number with a maneuver of the driving directions that represents a first occurrence of a particular interstate having the road number in a list of maneuvers for the route; and repeating the associating until all first occurrences of particular interstates are associated with corresponding interstate shield route symbols.

40. The method of claim 39 further comprising repeating the associating until all occurrences of particular interstates are associated with corresponding interstate shield route symbols.

41. The method of claim 39 wherein the road comprises an interstate and the graphical road-identifying symbol comprises an interstate shield route symbol.

42. A method for displaying driving directions having multiple maneuvers, the method comprising:

accessing maneuver information for a route from an origin to a destination;

applying priority information to determine a route symbol of several route symbol types to be associated with a maneuver of the driving directions; and associating the route symbol with the maneuver, wherein:

a graphical road-identifying symbol that has substantially the same appearance as an interstate road sign and includes a road number is associated with a maneuver of the driving directions that represents an occurrence of a particular road having the road number in a list of maneuvers for the route, each maneuver in the list of maneuvers for the route is associated with at most one route symbol, and the graphical road-identifying symbol comprises a route symbol of a country other than the United States.

43. The method of claim 42 wherein the road comprises an interstate and the graphical road-identifying symbol comprises an interstate shield route symbol.

44. A computer-readable medium or propagated signal having embodied thereon a computer program configured to display driving directions having multiple maneuvers, the medium or signal comprising one or more code segments configured to:

access maneuver information for a route from an origin to a destination, wherein the maneuver information comprises text information;

present, as a constituent part of the driving directions, a first maneuver along the route involving a particular interstate;

present, as another constituent part of the driving directions, a second maneuver along the route involving the particular interstate, such that the first and second maneuvers are presented consecutively among the driving directions; and associate an interstate shield route symbol that has substantially the same appearance as an interstate road sign with less than all presented maneuvers being presented along the route and involving the particular interstate.

45. The medium of claim 44 wherein the one or more code segments are further configured to associate a highway shield route symbol that has substantially the same appearance as a highway road sign and includes a road number with a maneuver of driving directions maneuver that represents only a first occurrence of a particular highway having the road number in the list of maneuvers for the route.

46. The medium of claim 45 wherein the one or more code segments are further configured to associate a turn route symbol with a maneuver based on a turn angle of the maneuver when the maneuver does not represent a first occurrence of a particular interstate having a particular road number in the list of maneuvers for the route and the maneuver does not represent a first occurrence of a particular highway having a particular road number in the list of maneuvers.

47. The medium of claim 44 wherein the one or more code segments are further configured to:

apply priority information to determine a route symbol type of several route symbol types to be associated with a maneuver of the driving directions that does not represent a first occurrence of a particular interstate; and associate the route symbol type with the maneuver.

48. The medium of claim 44 wherein the one or more code segments are further configured to display driving directions including the interstate shield route symbol associated with a maneuver.

49. The medium of claim 44 wherein:

the interstate shield route symbol is associated with the maneuver that represents only the first occurrence of the particular interstate among multiple consecutive driving directions involving the particular interstate, and the code segments are further configured to present the route symbol with a later maneuver that appears in the driving directions and that involves the particular interstate if the later maneuver is separated by at least one intermediary maneuver from the multiple consecutive driving directions involving the interstate.

50. A computer-readable medium or propagated signal having embodied thereon a computer program configured to display driving directions having multiple maneuvers, the medium or signal comprising one or more code segments configured to:

access maneuver information for a route from an origin to a destination;

associate an interstate routing symbol that has substantially the same appearance as an interstate road sign and includes a road number with the a first maneuver of the driving directions that represents a first occurrence of a particular interstate having the road number in a list of maneuvers for the route; and repeat the associating until all first occurrences of particular interstates are associated with corresponding interstate shield route symbols.

51. The medium of claim 50 wherein the one or more code segments are further configured to repeat the associating until all occurrences of particular interstates are associated with corresponding interstate shield route symbols.

52. A computer-readable medium or propagated signal having embodied thereon a computer program configured to display driving directions having multiple maneuvers, the medium or signal comprising one or more code segments configured to:

access maneuver information representing driving directions for a route from an origin to a destination, wherein the maneuver information comprises text information;

access priority information that includes, for each of several route symbol types, a priority and a condition;

determine a route symbol of the several route symbol types to be associated with a maneuver of the driving directions based on a priority associated with the route symbol and the maneuver fulfilling a condition associated with the route symbol; and associate the route symbol with the maneuver, wherein:

each maneuver in the list of maneuvers for the route is associated with at most one route symbol.

53. The medium of claim 52 wherein a highway shield route symbol that has substantially the same appearance as a highway road sign and includes a road number is associated with a second maneuver of driving directions that represents an occurrence of a particular highway having the road number in the list of maneuvers for the route.

54. A computer-readable medium or propagated signal having embodied thereon a computer program configured to display driving directions having multiple maneuvers, the medium or signal comprising one or more code segments configured to:
  access maneuver information for a route from an origin to a destination;
  apply priority information to determine a route symbol of several route symbol types to be associated with a maneuver of the driving directions; and
  associate the route symbol with the maneuver,
  wherein:
  an interstate shield route symbol that has substantially the same appearance as an interstate road sign and includes a road number is associated with a maneuver of the driving directions that represents an occurrence of a particular interstate having the road number in a list of maneuvers for the route, and
  each maneuver in the list of maneuvers for the route is associated with at most one route symbol, and
  the interstate shield route symbol comprises a highway shield route symbol of a country other than the United States.

55. A system for displaying driving directions having multiple maneuvers, the system:
  means for accessing maneuver information for a route from an origin to a destination, wherein the maneuver information comprises text information;
  means for presenting, as a constituent part of the driving directions, a first maneuver along the route involving a particular interstate;
  means for presenting, as another constitute part of the driving directions, a second maneuver along the route involving the particular interstate, such that the first and second maneuvers are presented consecutively among the driving directions; and
  means for associating an interstate shield route symbol that has substantially the same appearance as an interstate road sign with less than all presented a maneuvers being presented along the route and involving the particular interstate.

56. The system of claim 55 further comprising means for associating a highway shield route symbol that has substantially the same appearance as a highway road sign and includes a road number with a maneuver of driving directions maneuver that represents only a first occurrence of a particular highway having the road number in the list of maneuvers for the route.

57. The system of claim 56 further comprising means for associating a turn route symbol with a maneuver based on a turn angle of the maneuver when the maneuver does not represent a first occurrence of a particular interstate having a particular road number in the list of maneuvers for the route and the maneuver does not represent a first occurrence of a particular highway having a particular road number in the list of maneuvers.

58. The system of claim 55 further comprising:
  means for applying priority information to determine a route symbol type of several route symbol types to be associated with a maneuver of the driving directions that does not represent a first occurrence of a particular interstate; and
  means for associating the route symbol type with the maneuver.

59. The system of claim 55 further comprising means for displaying driving directions including the interstate shield route symbol associated with a maneuver.

60. The system of claim 55 wherein:
  the interstate shield route symbol is associated with the maneuver that represents only the first occurrence of the particular interstate among multiple consecutive driving directions involving the particular interstate, and
  the processor is further configured to present the route symbol with a later maneuver that appears in the driving directions and that involves the particular interstate if the later maneuver is separated by at least one intermediary maneuver from the multiple consecutive driving directions involving the interstate.

61. A system for displaying driving directions having multiple maneuvers, the system comprising:
  means for accessing maneuver information for a route from an origin to a destination;
  means for associating an interstate shield route symbol that has substantially the same appearance as an interstate road sign and includes a road number with a maneuver of the driving directions that represents a first occurrence of a particular interstate having the road number in a list of maneuvers for the route; and
  means for repeating the associating until all first occurrences of particular interstates are associated with corresponding interstate shield route symbols.

62. The system of claim 61 further comprising means for repeating the associating until all occurrences of particular interstates are associated with corresponding interstate shield route symbols.

63. A system for displaying driving directions having multiple maneuvers, the system comprising:
  means for accessing maneuver information representing driving directions for a route from an origin to a destination, wherein the maneuver information comprises text information;
  means for accessing priority information that includes, for each of several route symbol types, a priority and a condition;
  means for determining a route symbol of the several route symbol types to be associated with a maneuver of the driving directions based on a priority associated with the route symbol and the maneuver fulfilling a condition associated with the route symbol; and
  means for associating the route symbol with the maneuver,
  wherein:
  each maneuver in the list of maneuvers for the route is associated with at most one route symbol.

64. The system of claim 63 further comprising means for associating a highway shield route symbol that has substantially the same appearance as a highway road sign and includes a road number with a second maneuver of driving directions that represents an occurrence of a particular highway having the road number in the list of maneuvers for the route.

65. A system for displaying driving directions having multiple maneuvers, the system further comprising:
  means for accessing maneuver information for a route from an origin to a destination;

means for applying priority information to determine a route symbol of several route symbol types to be associated with a maneuver of the driving directions; and means for associating the route symbol with the maneuver, wherein:

an interstate shield route symbol that has substantially the same appearance as an interstate road sign and includes a road number is associated with a maneuver of the driving directions that represents an occurrence of a particular interstate having the road number in a list of maneuvers for the route, each maneuver in the list of maneuvers for the route is associated with at most one route symbol, and the interstate shield route symbol comprises a highway shield route symbol of a country other than the United States.

* * * * *